United States Patent
Rauen

(10) Patent No.: US 11,908,109 B1
(45) Date of Patent: Feb. 20, 2024

(54) ENHANCED VIDEO PROCESSOR

(71) Applicant: madVR Holdings, LLC, Rockville, MD (US)

(72) Inventor: Mathias Rauen, Hamburg (DE)

(73) Assignee: madVR Holdings LLC, Rockville, MD (US)

( * ) Notice: Subject to any disclaimer, the term of this patent is extended or adjusted under 35 U.S.C. 154(b) by 27 days.

(21) Appl. No.: 17/089,350

(22) Filed: Nov. 4, 2020

Related U.S. Application Data

(60) Provisional application No. 62/930,183, filed on Nov. 4, 2019.

(51) Int. Cl.
*G06T 5/00* (2006.01)
*G06T 5/50* (2006.01)
(Continued)

(52) U.S. Cl.
CPC ............ *G06T 5/009* (2013.01); *G06T 3/0093* (2013.01); *G06T 3/40* (2013.01); *G06T 5/002* (2013.01); *G06T 5/50* (2013.01); *G06T 9/00* (2013.01); *G06T 2207/10016* (2013.01); *G06T 2207/20024* (2013.01); *G06T 2207/20192* (2013.01); *G06T 2207/20208* (2013.01)

(58) Field of Classification Search
CPC . G06T 5/00; G06T 5/20; H04N 5/235; H04N 1/407; H04N 1/60; H04N 1/58; G06K 9/36
See application file for complete search history.

(56) References Cited

U.S. PATENT DOCUMENTS

| | | | | |
|---|---|---|---|---|
| 2010/0053376 | A1* | 3/2010 | Fukuda | G06T 5/009 |
| | | | | 348/235 |
| 2010/0272353 | A1* | 10/2010 | Bonnier | H04N 1/6058 |
| | | | | 382/162 |

(Continued)

OTHER PUBLICATIONS

Gastal, Eduardo SL, and Manuel M. Oliveira. "Domain transform for edge-aware image and video processing." ACM SIGGRAPH 2011 papers. 2011. 1-12.*

(Continued)

*Primary Examiner* — Li Liu
(74) *Attorney, Agent, or Firm* — Schwegman Lundberg & Woessner, P.A.

(57) ABSTRACT

Various improvements to video processing are described, including highlight recovery by dividing an image into different frequency ranges and compressing the lower range before recombining, tone mapping to avoid hue shifts, dynamic tone mapping based on detected scene changes in the video, dynamic tone mapping using the shape of a tone mapping curve that is changed based on the histogram of each video frame, HDR Luminance Channel Repair of artifacts, changing the shape of the tone mapping curve based on a histogram of each video frame, upscaling Chroma by using Luma channel information motion interpolation using Neural Networks, motion compensated noise reduction using Neural Networks to filter random noise and film grain, grain/noise agnostic upscaling using Neural Networks, and hiding video frames by strategically dropping or repeating them in unnoticeable places to prevent a visible video stutter based on scene characteristics to accommodate clock variations.

18 Claims, 10 Drawing Sheets

(51) Int. Cl.
  *G06T 3/00* (2006.01)
  *G06T 9/00* (2006.01)
  *G06T 3/40* (2006.01)

(56) References Cited

U.S. PATENT DOCUMENTS

| | | | | |
|---|---|---|---|---|
| 2013/0034307 | A1* | 2/2013 | Jerdev | G06T 5/009 |
| | | | | 382/232 |
| 2014/0112595 | A1* | 4/2014 | Huang | H04N 19/98 |
| | | | | 382/264 |
| 2017/0289571 | A1* | 10/2017 | El Mezeni | H04N 19/14 |
| 2019/0068865 | A1* | 2/2019 | Guerin | H04N 5/23229 |
| 2020/0007712 | A1* | 1/2020 | Ogawa | G06T 5/009 |
| 2020/0007734 | A1* | 1/2020 | Kagawa | G06T 7/174 |
| 2020/0013150 | A1* | 1/2020 | Kagawa | G06T 5/008 |
| 2020/0098098 | A1* | 3/2020 | Zhang | G06K 9/2054 |
| 2020/0272374 | A1* | 8/2020 | Kawai | H04N 1/6052 |
| 2021/0136297 | A1* | 5/2021 | Park | H04N 23/632 |
| 2022/0245775 | A1* | 8/2022 | Wang | G06T 5/50 |

OTHER PUBLICATIONS

"Histogram equalization", [Online]. Retrieved from the Internet: https: en.wikipedia.org wiki Histogram_equalization, (Accessed Dec. 11, 2019), 9 pgs.

Farbman, Zeev, "Edge-Preserving Decompositions for Multi-Scale Tone and Detail Manipulation", ACM Transactions on Graphics (TOG), vol. 27, Issue 3, Article No. 67, [Online]. Retrieved from the Internet: https: www.cse.huji.ac.il ~danix epd epd.pdf, (Aug. 2008), 10 pgs.

Gastal, Eduardo S. L., "Domain Transform for Edge-Aware Image and Video Processing", ACM Transactions on Graphics (TOG), vol. 30, Issue 4, Article No. 69, [Online]. Retrieved from the Internet: http: www.inf.ufrgs.br ~eslgastal DomainTransform, (Jul. 2011), 11 pgs.

* cited by examiner

ENHANCED VIDEO PROCESSOR

RELATED APPLICATION

This application claims priority to U.S. Provisional Application Ser. No. 62/930,183 (entitled Enhanced Video Processor, filed Nov. 4, 2019) which is incorporated herein by reference.

BACKGROUND

Tone mapping in video image processing is done to modify video frames that may be created with a high dynamic range (HDR) to an image with a lower dynamic range corresponding to a display device that is not capable of reproducing the same dynamic range. Tone mapping is the process of converting the tonal values of an image from a high range to a lower one. For instance, an HDR image with a dynamic range of 10,000 nits may be convened into an image with tonal values covering a range of 1,000 nits, 100 nits, or even lower. One goal in realistic rendering applications might be to obtain as close to a perceptual match between a real scene and a displayed image even though the display device is not able to reproduce the full range of luminance values.

SUMMARY

Various improvements to video processing are described. One aspect involves highlight recovery implemented by a computer or other hardware that includes receiving a video sequence having image frames with a high dynamic range, separating each image frame into low and high frequency components, compressing the low frequency components, reconstructing the image frames by combining the high frequency components with the compressed low frequency components, and rendering the reconstructed image frames for display on a device having a lower dynamic range.

Other enhanced video processing functions include one or more of tone mapping to avoid hue shifts, dynamic tone mapping based on detected scene changes in the video, HDR Luminance Channel Repair of artifacts, changing the shape of the tone mapping curve based on a histogram of each video frame, HDR Neural Network Tone Mapping to make intelligent decisions, upscaling Chroma by using Luma channel information, motion interpolation using Neural Networks, motion compensated noise reduction using Neural Networks to filter random noise and film grain, grain/noise agnostic upscaling using Neural Networks, and repeating or dropping video frames based on scene characteristics to accommodate clock variations.

DETAILED DESCRIPTION

Figure 1:
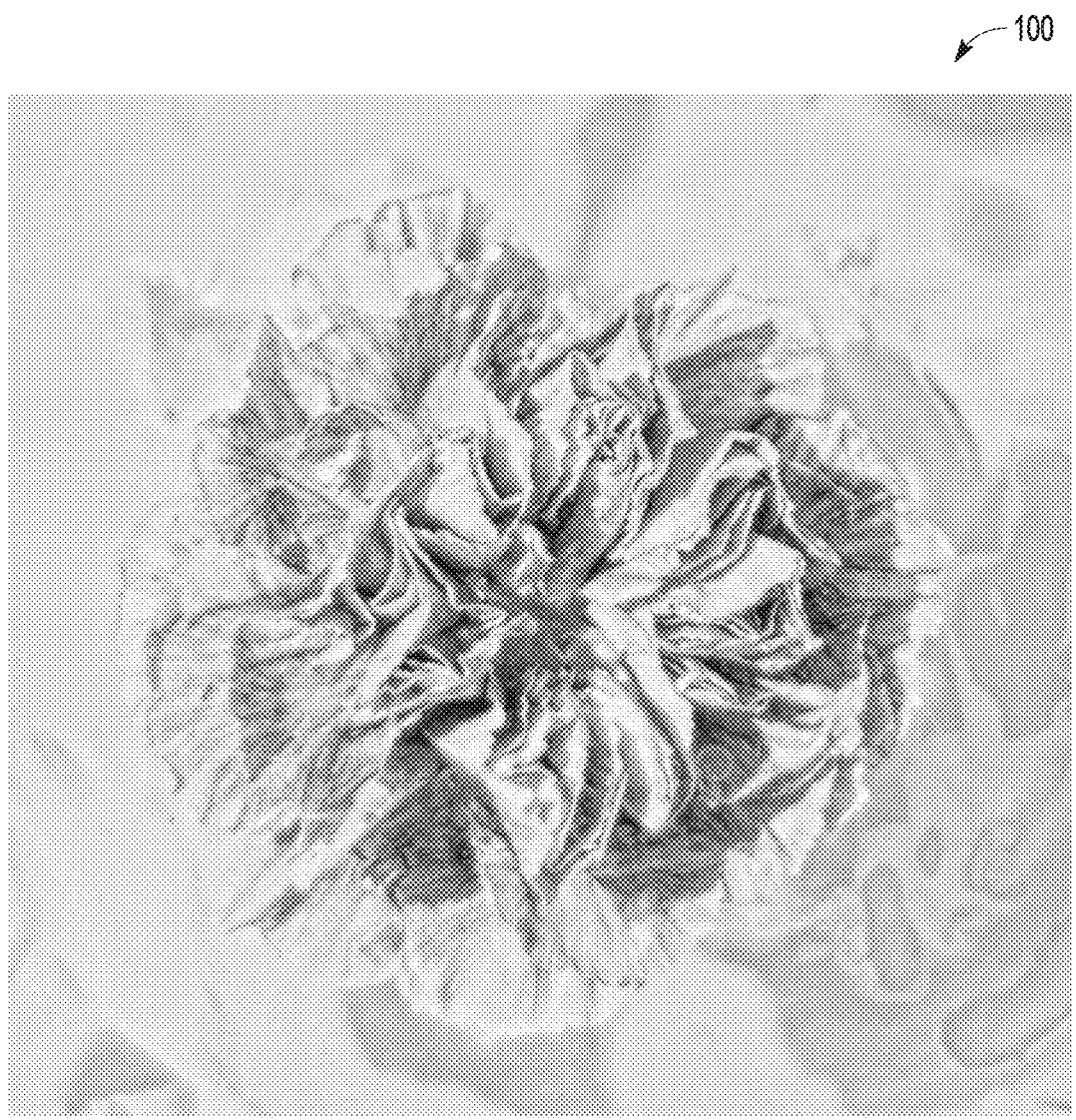
FIG. 1 is a view of an original image of a sequence of video images according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Several improvements to video processing are described herein. A description of tone mapping is first provided followed by a list of improvements.

Tone Mapping description: Tone mapping is the process of converting the tonal values of an image from a high range to a lower one. For instance, an HDR (high dynamic range) image with a dynamic range of 10,000 nits may be converted into an image with tonal values covering a range of 1,000 nits, 100 nits, or even lower. One goal in realistic rendering applications might be to obtain as close to a perceptual match between a real scene and a displayed image even though the display device is not able to reproduce the full range of luminance values.

Various images of a spear are described to show differences between different tone mapping algorithms. In an accurate image of a spear with a bright tip, the spear tip appears extremely bright, with lots of detail. In an earlier video rendering product, the image of the spear appears all green (which is correct), with the inside nicely bright, and containing some details, but not be as much detail as in the accurate image. Another image of the spear by a different prior device using a prior fairly expensive tone mapping algorithm results in an image wherein the tip is all green (which is correct). However, the inside of the spear is just a flat surface, with zero detail, and it's not bright enough by a long shot. In still a further prior version of tone mapping the inside of the spear appears nicely detailed, but it has turned yellow, which is incorrect. The spear image is basically a test pattern that shows extremely big differences between several different tone mapping algorithms. These algorithms are applied on still images, and fare even worse when attempted to be used on a sequence of video frames.

There are multiple different range devices, such as RGB TV and PC levels, and also YCbCr TV and PC levels, which work like this:

A black RGB TV pixel is 16, 16, 16. A white pixel is 235, 235, 235.

A black RGB PC pixel is 0, 0, 0. A white pixel is 255, 255, 255.

A black YUV TV pixel is 16,128,128. A white pixel is 235, 128, 128.

A black YUV PC pixel is 0,128,128. A white pixel is 255, 128, 128.

A "nit" is another way to describe a brightness of 1 candela per square meter (cd/m2) An average movie theater screen can probably get as bright as about 50 nits. If your TV is a few years old, pre-HDR, it can probably reach between 100 and 400 nits. Current best OLED displays can display about 800 nits. Some LCD type displays can reach up to 2000 nits, but most don't exceed 1500 nits. Future displays may reach high levels of nits.

In one example, let's say a projector has a measured brightness or luminance of about 50 nits max. The brightness (luminance) of each pixel is calculated by applying a specific weight to the Green, Red and Blue components of the pixel like this: Y=0.2126*Red+0.7152*Green+ 0.0722*Blue. What this means is that Green has a *much* bigger effect on the perceived brightness of each pixel than Red, and even more so than Blue. And this also directly tells us how much nits a pure Blue screen will be measured at: If the white screen measures 50 nits, then a BT.709 pure Blue screen will measure only 0.0722*50 nits=3.61 nits.

In YCbCr you can separately define the luminance of each pixel and its hue. So let's say you use an Y value of 235 (in TV levels), and you set CbCr so that it says "pure blue". When you convert this YCbCr pixel to RGB. A Y value of 235 suggests that this pixel should reach the peak luminance of your display, which would be about 50 nits. However, Blue only contributes a tiny amount to the perceived brightness of each pixel. One would have to make the Blue component of the RGB pixel very large to make this Blue pixel actually measure as 50 nits. Roughly estimated, the Blue component of the RGB pixel would probably have to be something like 235/0.0722=3255. The resulting RGB pixel might be in the neighborhood of [0, 0, 3255]. Which of course makes no sense since 8 bit RGB tops out at 235.

A peak white or completely black pixel has absolutely zero color. Black and white are by definition without color. Given that an SDR Blu-Ray is encoded with a very bright sky, near to the peak Y value of 235, the Sky can only hold very little color. As we've seen above, if we tried to make a Blue pixel with an Y value of 235, the resulting RGB value would be around [0, 0, 3255], which is completely impossible with 8 bit RGB.

Studios actually work in RGB. The studio monitors are RGB, the movie itself is RGB. YCbCr is only used as a transport format, so Y can be encoded in full resolution and CbCr can be scaled down in resolution, with the only purpose being to save space. So considering that the movie is RGB, the brightest pixel has to be white. In 8 bit that would be [235, 235, 235]. In 10 bit that would be [940, 940, 940]. The studio can't exceed 235 in 8 bit, or 940 in 10 bit. So by definition the brightest pixel any consumer format can encode is white, not colored. Which also means that a pixel which has an Y value of 235, cannot be colored, because such pixels don't convert into valid RGB triplets. And the studio master is RGB. Such pixels will never exist in any Blu-Ray etc.

It's not a black and white issue, either. The nearer we go to peak white (or total black), the less color each pixel can hold. The biggest amount of color a pixel can hold is with Y sitting nicely in the middle.

In one example, a true 10,000 nits video, with pixels going from 0 nits (black) up to 10,000 nits is to be rendered on an old OLED display which can do about 200 nits. There are two very simple methods of rendering. In a first rendering method, all pixels could be linearly darkened by a factor of 50, so 10,000 nits becomes 200 nits, 50 nits becomes 1 nits etc. This method obviously produces extremely dark images because the nits range which is most important (0-100 nits) now tops out at 2 nits on screen. It doesn't really make sense to use just 0-2 nits for all the important pixels and use 3-200 nits for HDR highlights.

Alternatively, all pixels from 0-200 nits could be rendered untouched and clip all pixels above 200 nits to 200 nits. 10,000 nits becomes 200 nits, 300 nits becomes 200 nits, 200 nits stays 200 nits. 100 nits stays 100 nits. All pixels below 200 nits will be rendered absolutely perfectly this way, but the clipping totally destroys any detail in brighter regions. Basically, highlight areas will turn into giant "blobs" of a single brightness. These very simple methods are not optional.

In a further example, a curve can be smoothed to adjust the compression factor depending on the pixel brightness. So extremely bright pixels get compressed a lot, but dark pixels only get compressed very slightly, with a smooth curve in between. This method actually works ok, but it's not optimal yet, because it still compresses even a 2 nits pixel slightly.

The curve may be improved by not compressing 0-100 nits pixels at all, but by starting to compress above 100 nits. One can't leave a 100 nits pixel untouched, and then suddenly compress a 101 nits pixel a lot. That would look strange. A smooth curve may be used to gradually ramp up the compression factor above 100 nits. To further improve the curve, pixels from 0-x nits remain untouched, and "x" depends on the brightness of the projector/display/television. Roughly estimated, "x" is about a quarter of your display's peak brightness. So if the projector can do 50 nits, then the method leaves all pixels of 0-12 nits untouched, and starts compressing pixels above 12 nits.

In one embodiment, a curve is defined to compress a 10,000 nits video into a 200 nits signal for an OLED display. The curve is applied in two simple ways. Some recommend that the compression curve be applied on the "Y" channel, which means the defined brightness/luminance of each pixel is directly changed. Others apply the compression curve on the Red, Green and Blue channels separately, after having converted YUV to RGB. Compressing the Y channel has problems. A 50 nits projector achieves 50 nits only with a pure white image and with a pure blue image your projector only gets like 3-4 nits. In theory a YUV pixel can be defined saying "10,000 nits pure blue", but this pixel doesn't convert to a valid RGB pixel. "10,000 nits white" would convert properly to RGB [235,235,235] (when using 8 bit). But "10,000 nits blue" would convert to something like [0,0,3250]. Which makes no sense, the blue component will be clipped to 235 somewhere. And even if it's not clipped by processing, the display cannot technically render a blue subpixel any brighter than 235. It's technically completely impossible to render it with the asked-for brightness. The nearer the Y channel gets to 235 (in 8 bit), the less color/hue/saturation it can hold. At Y=235, the pixel can only be white, it cannot have any color at all. At Y=230, it can have a little bit of color, but only a very tiny little bit.

Let's say the 10,000 nits video has a 50 nits pure blue pixel in it. That's a perfectly valid pixel, because a 10,000 nits display can achieve more than 500 nits for a pure blue pixel. Tone mapping this video for an old 200 nits OLED, the tone mapping curve will leave all pixels from (roughly estimated) 0-50 nits untouched, while mapping 51-10,000 nits into the 51-200 nits range. The tone mapping curve will not touch the 50 nits blue pixel at all, because the Y channel at only 50 nits is fairly dark. After tone mapping is done, the new tone mapped video signal now asks for this blue pixel to (still) be rendered at 50 nits, although the display now tops out at 200 nits for a *white* frame. Technically, the 50 nits pure blue YUV pixel will overflow when converting to RGB, to something like [0,0,980]. Somewhere along the way, this blue value of 980 will be clipped to 235. Which means the pixel will keep its color (hue and saturation), but its luminance will be cut by a factor of about 4×.

This is the reason why some tone mapping algorithms produce the "blob" in the green spear image: The pixels inside of the spear have invalid YUV values after tone mapping, so after YUV→RGB conversion, the green channel overflows and will be clipped to 235 for all the pixels inside of the spear.

Applying the tone mapping compression curve on the Y channel can produce invalid YUV pixels, which after YUV→RGB conversion will produce invalid RGB values, which will be clipped, producing blobs, or sometimes even hue shifts. Based on this, the green spear scene is so useful because if a tone mapping algorithm produces the green blob problem, we can conclude that the tone mapping algorithm probably compresses the Y channel, as recommended by Dolby and BT.2390.

Compressing the RGB channels separately instead of compressing the Y channel may be simpler to implement or even look better than compressing the Y channel. If one wants to make an RGB image darker, one can subtract the same number from each RGB channel or divide each RGB channel with a fixed factor. In one example, it is desired to make RGB pixel [20,40,60] darker a lot. Subtracting 20 from each component may be done so the pixel would become [0,20,40]. Before subtraction, the pixel has a red component in it, after subtraction it doesn't, anymore. This type of making the image brighter shifts hue. The proper way to adjust the brightness in an RGB image is to multiply each RGB component with the same factor. E.g. if one wants to increase brightness a lot, we could multiply [20,40,60] into [40,80,120]. Or to darken it, divide [20,40,60] into [2,4,6]. The key to RGB brightness adjustments is that the ratio of the 3 RGB channels to each other must stay constant.

Tone mapping the RGB channels separately in conjunction with use of the mapping curve leaves very dark pixels completely untouched but compresses very bright pixels very strongly. If for example RGB pixel [10,100,200] is compressed on each channel separately, the Red component of 10 will stay untouched. The Green component of 100 will be compressed slightly. The Blue component of 200 will be compressed a lot. The ratio of the RGB channel changes: Red doesn't get modified at all, but Blue gets reduced a lot. The pixel loses a lot of Blue hue, and turns more towards Red. Tone mapping the RGB channels separately causes heavy hue shifts. This can even already happen with fairly dark pixels, if they happen to have e.g. a large Blue component.

An additional problem comes from tone mapping each RGB channel separately, given the general tendency of reducing the value of the highest channel while reducing the value of the lowest channel(s) much less. That practically means that the pixel moves a little bit towards gray, reducing saturation. However, depending on the exact RGB channel values, some pixels might not be affected much or at all. The behavior of this tone mapping method is a bit unpredictable. One benefit does result from mapping RGB channels separately. Since each channel is tone mapped completely separately, there cannot be any overflows (blobs). Each channel on its own is compressed with a perfectly nice curve. So this whole tone mapping method produces great highlight detail.

In one embodiment, per-RGB-channel tone mapping is used to obtain great highlight detail. The luminance information is used from that mapping. The hue and saturation are completely replaced using different formulas. Several additional algorithms are used to fix problems arising from the combination of channel-based tone mapping and hue and saturation replacement.

In very specific scenes, keeping hue perfectly accurate actually can appear kind of weird. This is especially true with fire and explosion scenes. These naturally have lots of red, orange and yellow in them. If tone mapped without allowing any hue shifts, the scenes sometimes turn out very red(ish), because the yellow can sometimes disappear a little.

Because of this problem, an option called "Color Tweaks for Fire" is provided, which actually allows very bright red/orange pixels (and only those pixels) to shift in hue towards yellow a little bit. This helps make fires and explosions look slightly more realistic, although it's less scientifically accurate.

Improvements:

Improvement 1) High dynamic range (HDR) Highlight Recovery: Rendering a video sequence of 10,000 nits image on e.g. a 100 nits projector or even with higher nit displays requires heavy compression of bright pixels. This heavy compression causes strong loss of highlight detail. Highlight Recovery tries to avoid this problem by performing the following functions on the video images:
  a) separating the image into low and high frequency components.
  b) applying the compression only on the low frequencies.
  c) adding the high frequencies back in untouched.

While some similar techniques have been used on still photographs, the above functions have not been performed on frames in a video sequence during real time playback for the purpose of preserving highlight detail.

Highlight Recovery: During some tone mapping methods, very bright pixels can get compressed a lot, while dark pixels don't get touched at all by tone mapping. Due to the strong compression, the value difference between neighboring pixels in HDR highlight regions gets reduced. Before tone mapping an explosion scene, one pixel might have a luminance of 10,000 nits, and the neighbor pixel might have a luminance of 8,000 nits. But after tone mapping, the first pixel might be 200 nits, and the 2nd 199 nits. On a perfect 10,000 nits display one can see a very clear difference between the mentioned 2 pixels, but on a 200 nits display, both pixels look virtually identical. Tone mapping compression causes a strong loss of highlight detail in very bright HDR image areas, because due to the compression, the pixels lose most of their luminance differences to each other.

Highlight Recovery is a method to "fix" this problem. One prior way to fix the problem utilized a type of sharpening filter which measured the "texture strength" for each HDR pixel and applied exactly as much sharpening as needed to recover the same "texture strength" after tone mapping which existed before tone mapping. Applying sharpening as a post-processing algorithm, however, is not ideal. Furthermore, sometimes highlight texture detail gets lost completely, so even extreme amounts of sharpening can't bring it back.

A new algorithm tackles this problem completely differently. In a first step, before any tone mapping is done at all, each video frame is split into two parts: a) low frequencies and b) high frequencies. Or in simpler terms: The low frequency image looks like a blurred version of the original frame. The high frequency image looks like a "bump map" (pure texture), The original untouched video frame can be perfectly restored by simply adding both high and low frequency bitmaps up. Image processing is not really changed as the image frames are split into separate frequency ranges.

Next, tone mapping is performed as usual, but only on the low frequency image. After tone mapping is complete, the original high frequency image is added back on the tone mapped image. One benefit of this approach is that no sharpening is done. The high frequencies of the original image are preserved, allowing one to see exactly the same amount of highlight "texture" detail after tone mapping which a perfect 10,000 nits display would show.

A simple approach for splitting into two separate frequency ranges would be to simply blur the original video frame a lot, then subtract the blurred image from the original image to get the high frequency part. This can work ok, but can result in ringing/halo artifacts, because strong image edges will be blurred a lot, as well, producing very strong artifacts.

A nearly artifact free frequency splitter would be a little slow for image frames of a video sequence given current computing resource speeds in home and theater equipment, without spending a lot on higher speed computing resources.

Some types of recording media, such as ultra-high definition (UHD) high dynamic range (HDR) whether streamed or from other sources such as media files or Blu-Ray discs are capable of recording to a max of 10,000 nits. However, the big majority of pixels goes typically no higher than 200 nits. Usually 200 nits is considered to be "diffuse white", which means it's the brightest white for "normal" (non-HDR) pixels. All pixels above 200 nits are usually considered HDR pixels, for specular highlights, explosions, the sun etc.

Now let's say we're rendering a movie scene which mostly has pixels below 200 nits (as most scenes do), but there's one very bright explosion which has pixels from 1,000 nits up to 10,000 nits. If such a scene is displayed by a true 10,000 nits display, we don't need to apply any brightness compression, but can watch the scene in full quality. Meaning, pixels with 10,000 nits will be much brighter than pixels with 1,000 nits, so it's easy for our eyes to see full detail in the explosion.

Unfortunately, there's no consumer display available today which can achieve 10,000 nits. The image needs to be processed to make it look good on the given display. The problem is especially big for front projection where typical consumer projectors often are only capable of producing no more than 50-100 nits.

There are several approaches used to process such a 10,000 nits explosion scenes for a 100 nits projector. In a first approach, all pixels up to 100 nits can be rendered exactly as the movie is encoded. All pixels above 100 nits may be clipped to exactly 100 nits, the maximum of the projector. Using this approach, the whole explosion will be clipped at exactly 100 nits, so it will be a flat blob with zero detail/structure in it. This looks extremely bad, so it's unusable.

In a second approach, each pixel's brightness may simply be divided by a factor of 100, so 10,000 nits becomes 100 nits, 100 nits becomes 1 nits, and 1 nits becomes 0.01 nits. This might work ok for the brightest pixels in the explosion, but everything else becomes so extremely dark that it's unwatchable, so this approach is unusable, as well.

A third approach is to use a non-linear brightness compression curve (so called tone mapping curve), which compresses bright pixels much more than dark pixels. For example, pixels from 0-10 nits might not be changed in brightness at all, pixels from 10-20 nits might be darkened moderately, pixels from 20-200 nits might be compressed quite noticeably, and the brighter pixels become, the more their brightness is compressed. This would result in the majority of pixels (those below 200 nits) to be only moderately compressed in brightness, which results in the overall image staying acceptably bright. The over bright explosion pixels are compressed extremely strongly, though. For example, let's say we compress all pixels from 0-200 nits into the projector's range of 0-70 nits, and compress all pixels above 200 nits into the projector's range of 70-100 nits using a tone mapping curve.

The third approach is commonly used today. However, compressing all pixels that are encoded between 200-10,000 nits into e.g. just 70-100 nits on the projector, results in the over bright HDR pixels being condensed so much that a lot of detail is lost. Explosions encoded using the third approach lose most of their "texture detail".

In order to avoid the heavy loss of texture detail in over bright HDR areas of a video frame, a "Highlight Recovery" method described above and described in further detail below may be used.

In the first step, the original HDR image is split into low frequency and high frequency detail. High frequency detail may be thought of as being "texture detail", and the low frequency information is just the flat (texture-less) image.

In a next step a brightness compression curve is applied only on the low frequency image. Finally, the original high frequency information is merged back into the tone mapped (brightness compressed) image. This method avoids the loss of texture detail.

Splitting the image into low versus high frequency components may be done several different ways. A simple implementation involves using a simple gaussian blur.

First, a heavy gaussian blur is applied on the image. This blur removes all high frequencies (=texture detail). The blurred image only contains low frequencies. Formula: "LowFreq=GaussianBlur(OriginalImage)".

Second, the blurred image is subtracted from the original image to get the high frequencies. Formula: "HighFreq=OriginalImage−LowFreq".

The original image may be restored simply by adding low and high frequencies back together: "OriginalImage=LowFreq+HighFreq" if desired.

Figure 2:
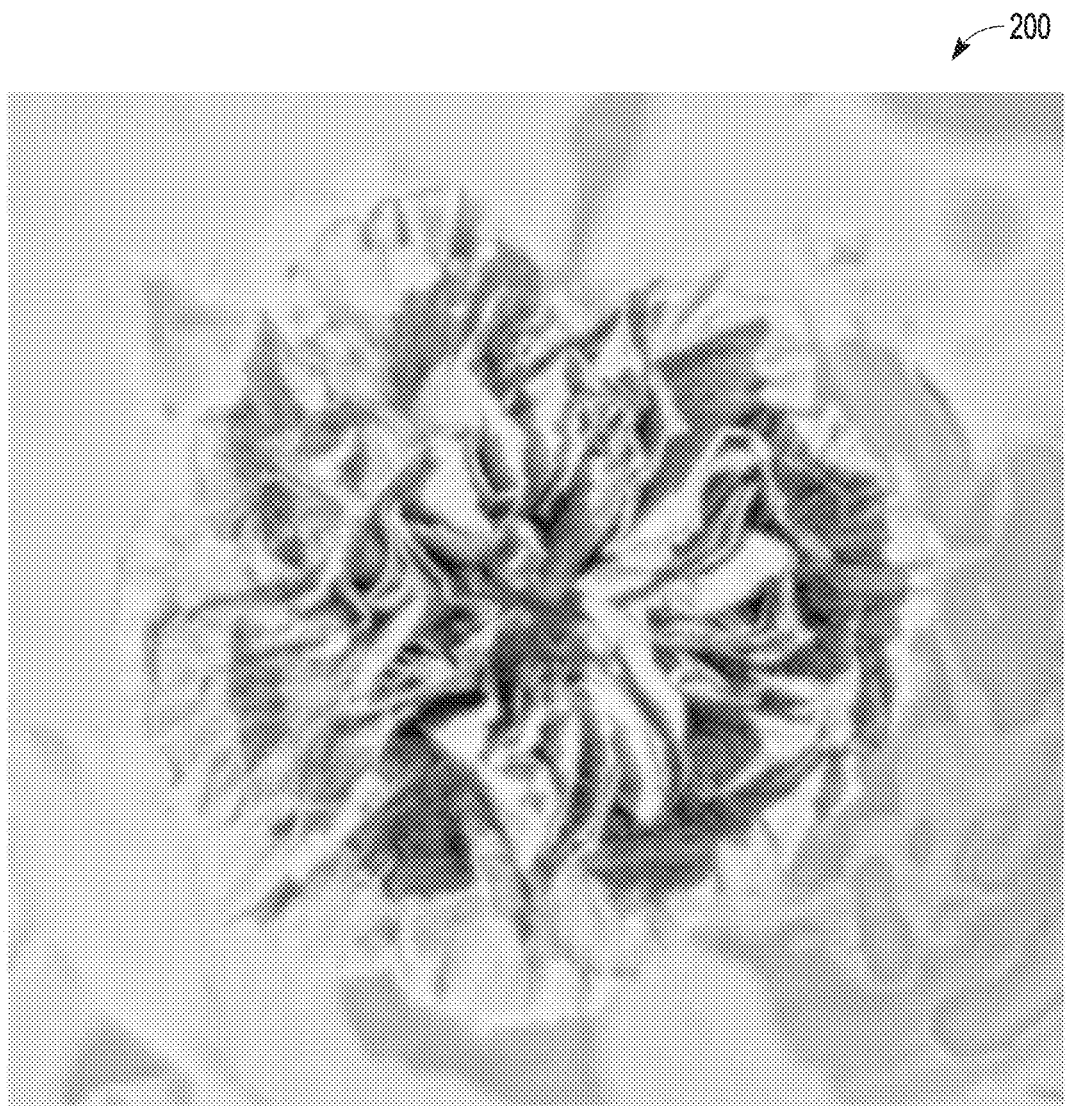
FIG. 2 is an illustration of a gaussian low frequency image of the image of FIG. 1 according to an example embodiment.
Figure 3:
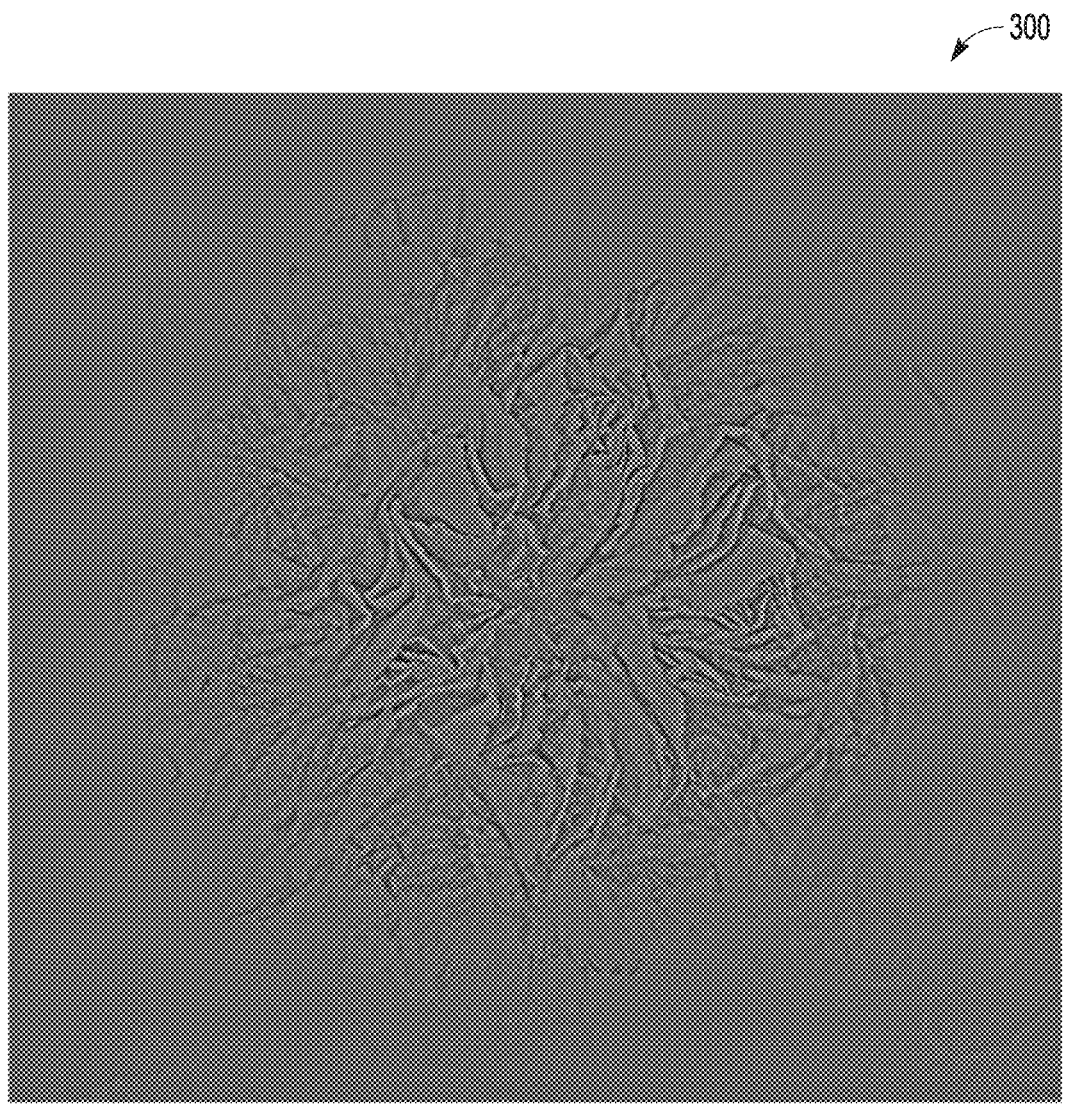
FIG. 3 is an illustration of a gaussian high frequency image of the image of FIG. 1 according to an example embodiment.

Several images are shown as examples in this order below: FIG. 1 is an illustration of an original image 100 of a sequence of video images. FIG. 2 is an illustration of a gaussian low frequency image 200 of the image of FIG. 1. FIG. 3 is an illustration of a gaussian high frequency image 300 of the image of FIG. 1.

The high frequency image 300 is gray when there's no texture detail, black when the texture detail is darker than the neighborhood and white when the texture detail is brighter than the neighborhood. The high frequency image 300 is shown to be centered at gray, so one can properly see where the texture detail is darker than the neighborhood. The true high frequency parts are centered around 0, though, so they go negative for dark parts and positive for bright parts. But this is impossible to show in an image because an image cannot have negative components. That's why middle gray was added for illustration purposes only. This is an approach usually used to visualize such a high frequency difference image.

In order to demonstrate how the Highlight Recovery algorithm works, take the OriginalImage, split it into low frequency image 200 parts and high frequency image 300 parts and then simply make the low frequency image 300 a lot darker. This is somewhat similar to what tone mapping does. Although for the purpose of this demonstration, a simple linear darkening of the low frequency image 200 is used, while tone mapping uses a non-linear brightness compression curve. But for the sake of demonstration, this simplified approach should suffice. After the low frequency image 200 has been darkened, the high frequency image 300 detail is added back to get the final image as shown in FIG. 4 at 400.

The final image 400 becomes a strongly darkened version of the original image 100, but still has the same high frequency image 300 texture detail.

Figure 4:
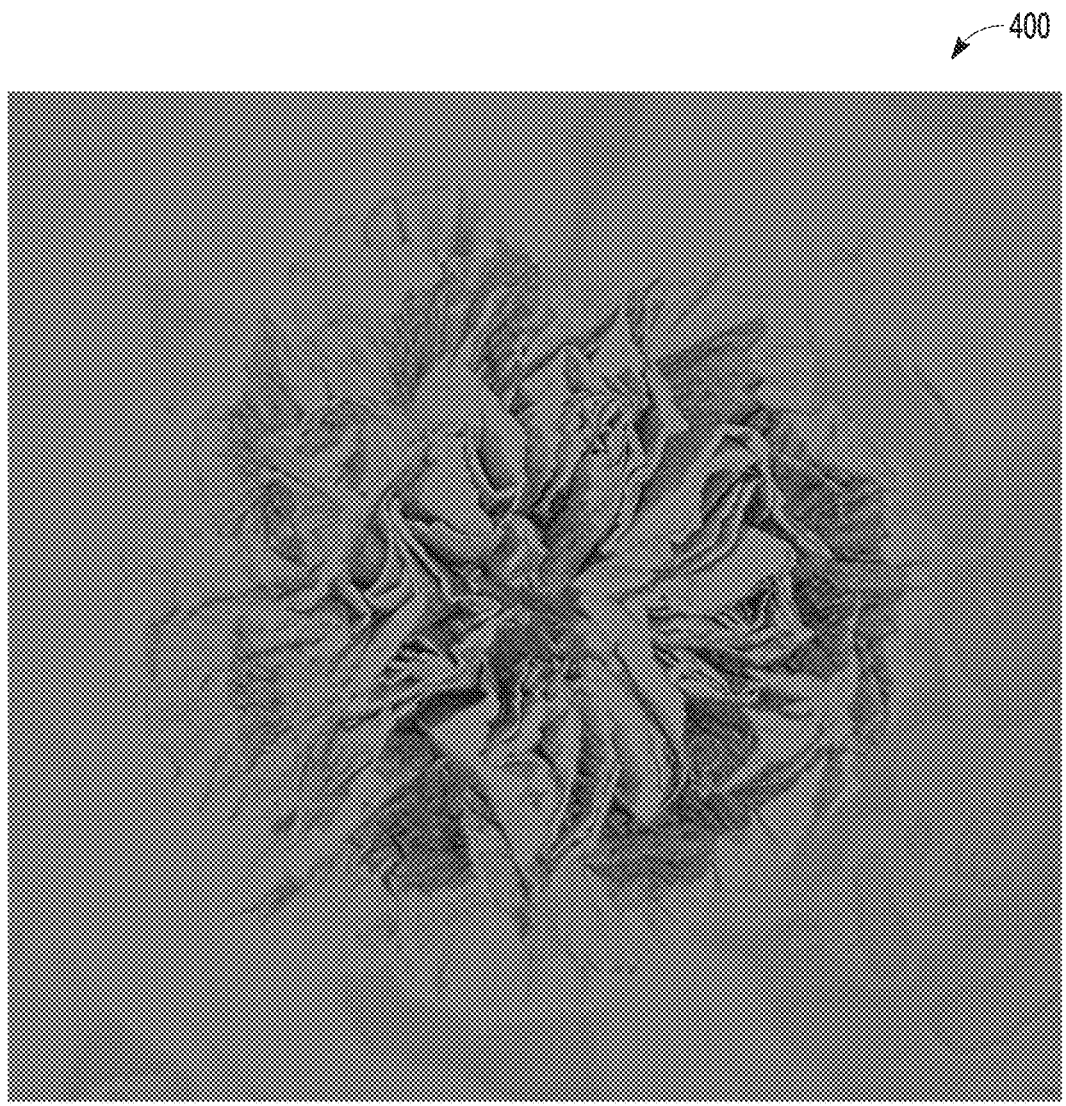
FIG. 4 is an illustration of a final image derived from the low frequency image and the high frequency image according to an example embodiment.
Figure 5:
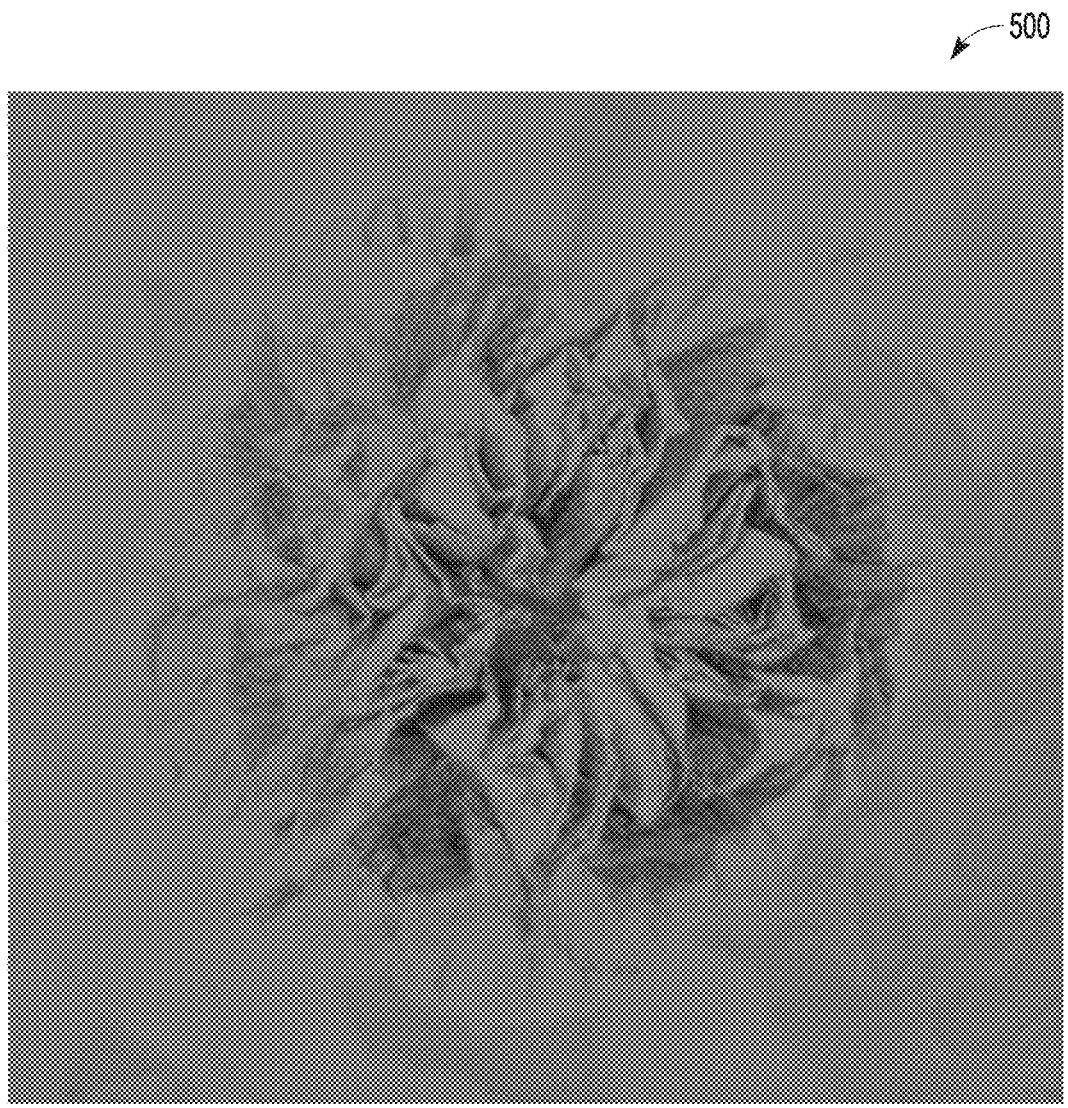
FIG. 5 is an illustration of a darkened original image according to an example embodiment.

For comparison purposes, FIG. 5 is a darkened original image 500 without splitting it into low frequency and high frequency parts. Image 500 is shown to compare how texture detail is lost through the darkening:

Comparing the FIG. 1 original image 100 versus the FIG. 5 dark original image 500, versus the FIG. 4 gaussian final image 400, it can be observed that the gaussian final image 400 has roughly the same amount of texture detail as the original image 100, although it is significantly darker. The edges are strongly sharpened this way, which looks quite ugly and is not the intended result. The purpose was not to enhance edges. Instead, it is desired to preserve the texture detail.

It's a well-known problem that using a simple Gaussian Blur to split an image into low frequency versus high frequency parts has problems with edges. The scientific world has suggested many alternative algorithms, like Bilateral Blurring (edge-aware Gaussian blur).

Figure 6:
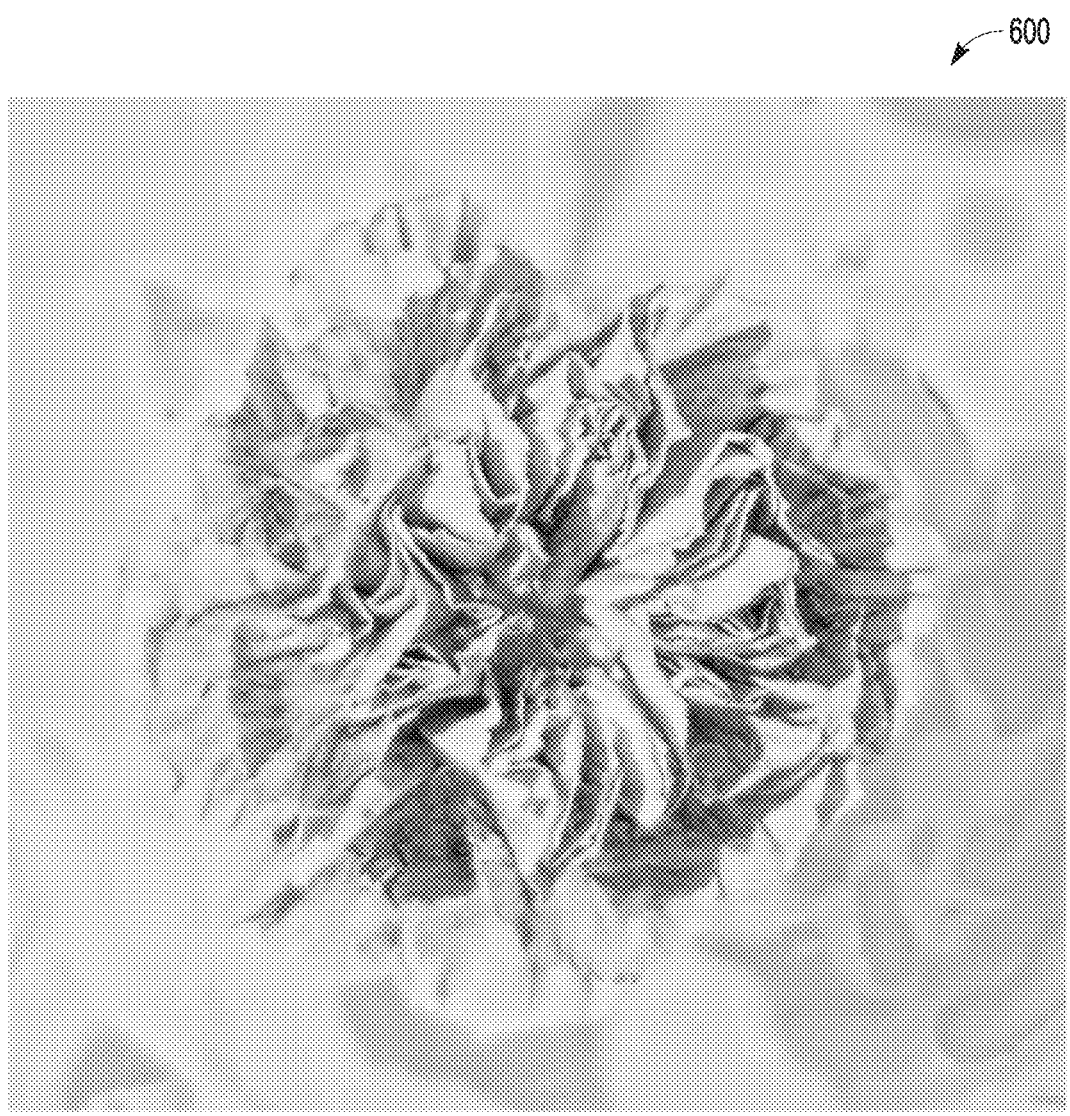
FIG. 6 is a view of an alternative original image for use in a WLS image splitting method according to an example embodiment.
Figure 7:
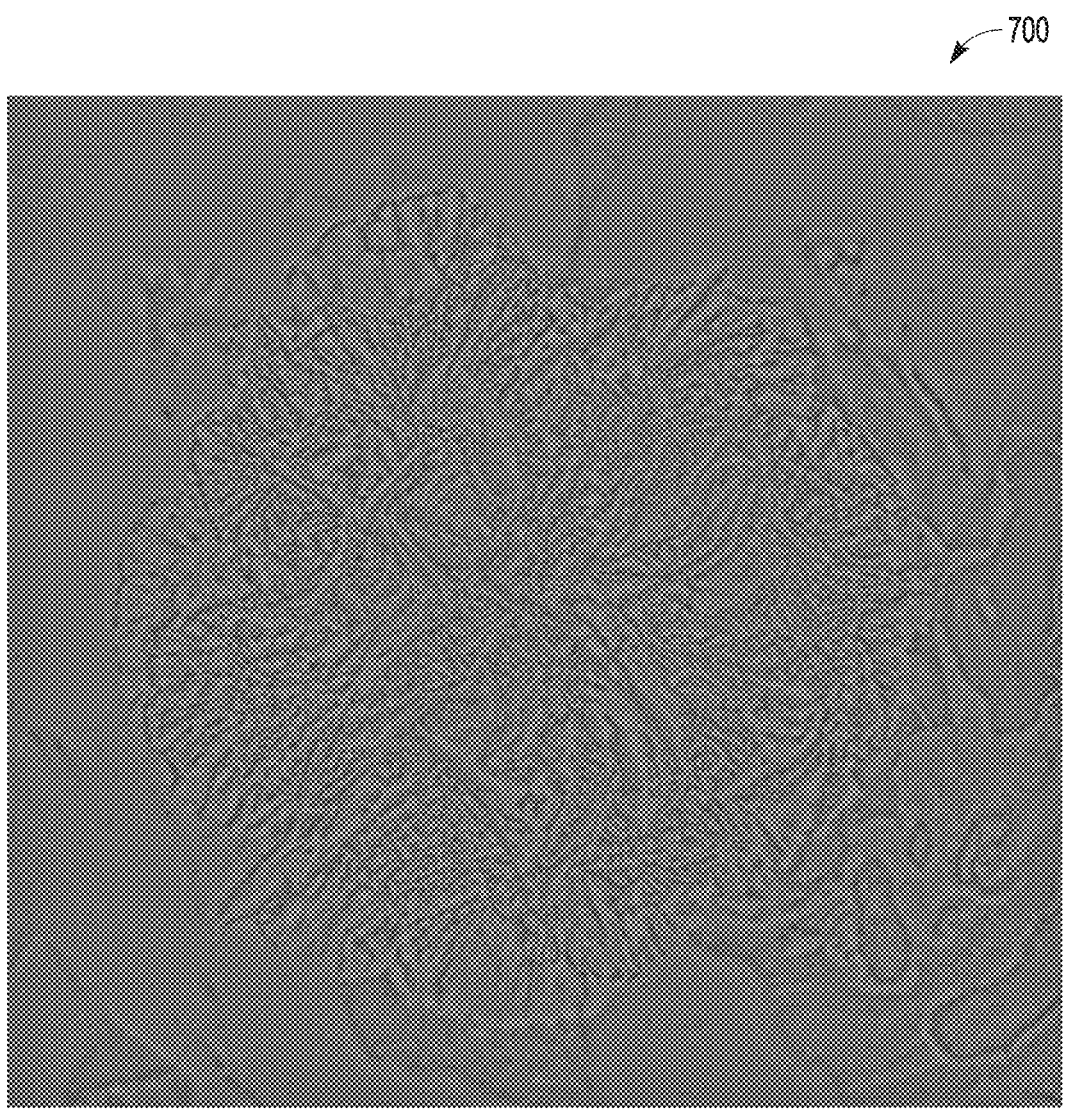
FIG. 7 is an illustration of a high frequency image derived from the image of FIG. 6 according to an example embodiment.
Figure 8:
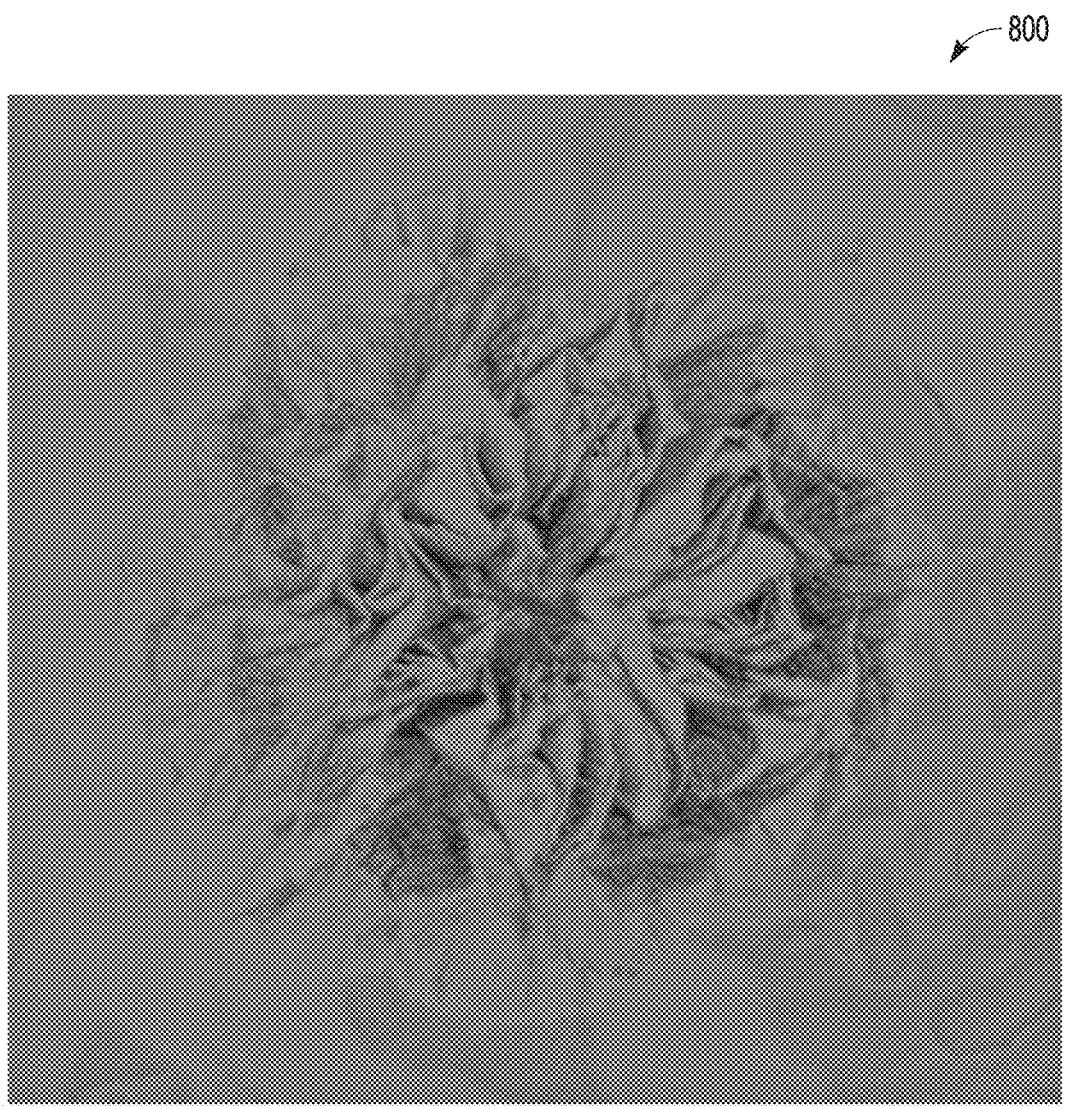
FIG. 8 is an illustration of a final WLS image according to an example embodiment.

Most recently, a WLS algorithm used for photographs has been found to produce the best image quality splitting into a FIG. 6 low frequency image 600 versus a FIG. 7 high frequency image 700 which results in a FIG. 8 WLS final image 800.

However, WLS is a very slow algorithm, so it can't be used for real time processing.

Compared to Gaussian images, the WLS final image 800 manages to preserve the full texture detail without introducing any edge (or other) artifacts.

The Highlight Recovery algorithm is fused into an overall tone mapping pipeline in one embodiment. The pipeline in one embodiment includes the following steps:
 a. Separate image into LowFreq and HighFreq parts, in the original PQ encoding.
 b. Apply brightness compression on the LowFreq image.
 c. Reduce brightness and saturation for pixels which are outside of the valid target gamut.
 d. Repair whatever damage step c. did to the luminance channel.
 e. Reduce saturation once more where needed to fit the pixels into the target gamut.
 f. Add the HighFreq parts back into the image, in PQ encoding.

Figure 9:
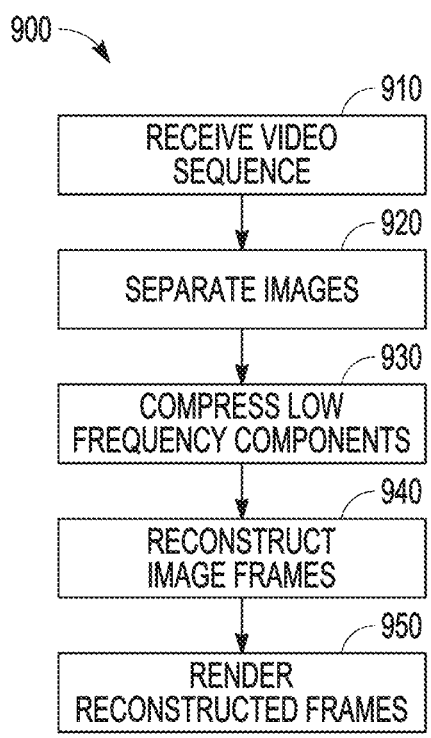
FIG. 9 is a flowchart illustrating a computer implemented method of highlight recovery for video images according to an example embodiment.

FIG. 9 is a flowchart illustrating a method 900 of performing highlight recovery according to an example embodiment. Method 900 begins with an operation 910 to receive a video sequence having image frames with a high dynamic range. In one embodiment, the received video sequence comprises pixels with a luminance range of 0 to up to 10,000 nits and the lower dynamic range comprises 0 to a selected number of nits, such as anywhere between 20 and 500 nits. In one example the lower dynamic range comprises 0 to 100 nits. Each image frame is separated at operation 920 into low and high frequency components.

Separating each image into low and high frequency components may be performed by blurring each video frame image and subtracting the blurred video frame images from the received video frame images to obtain the high frequency components. Blurring may be performed using a Gaussian blur or an edge preserving blur that preserves the geodesic distance between points on the curves, adaptively warping an input signal perform 1D edge-preserving filtering in linear time.

Operation 930 compresses the low frequency components. Compressing the low frequency components may be performed by tone mapping the low frequency components. Operation 940 reconstructs the image frames of the video sequence by combining the high frequency components with the compressed low frequency components. Reconstructing the image frames of the video sequence may done by adding the high frequency components to the compressed low frequency components. The reconstructed image frames of the video sequence are rendered at operation 950 for display on a device having a lower dynamic range.

Improvement 2) HDR Hue Tweak for Fire & Explosions: A desired property of a good tone mapping algorithm is to avoid hue shifts. However, if fire and explosion scenes are rendered without any hue shift, they tend to look a bit unnatural, because there's mainly only red hues, but barely anything orange or yellow. Humans expect such scenes to also have lots of orange and yellow hues, for whatever reason. In various embodiments, tone mapping algorithm intentionally shifts hues a bit, which is normally not a desired property. The hue shifts are limited to bright and highly saturated red/orange hues, so that other hues are not negatively affected.

Improvement 3) HDR Scene Detection: For dynamic tone mapping, the exact compression curve ideally needs to be changed for each video frame. But doing such changes too quickly can result in visible flickering artifacts. So the changes need to be done slowly and smoothly. However, doing that results in visible brightness pumping artifacts when there's a scene change from a very dark to a very bright scene (or vice versa). As a result, an algorithm is used to detect scene changes in the video. If a scene change is detected, the tone mapping compression curve is adjusted immediately, without any smoothing.

Improvement 4) HDR Luminance Channel Repair: Tone mapping requires a compromise between losing saturation vs brightness for different pixels. These saturation vs brightness adjustments can damage the integrity of the luminance channel. An algorithm is used which repairs such artifacts.

Improvement 5) HDR HSTM (Histogram Shaped Tone Mapping): The shape of the tone mapping curve is changed based on the histogram of each video frame using a unique approach.

Histogram Shaped Tone Mapping (HSTM) may also be referred to as contrast recovery. Usually, when compressing an HDR image (e.g. with up to 10,000 nits brightness) into a range that a typical display can handle (e.g. a front projector with 100 nits or a TV with 1,000 nits), a non-linear tone mapping compression curve is used, which compresses bright pixels much more than dark pixels.

Figure 10:
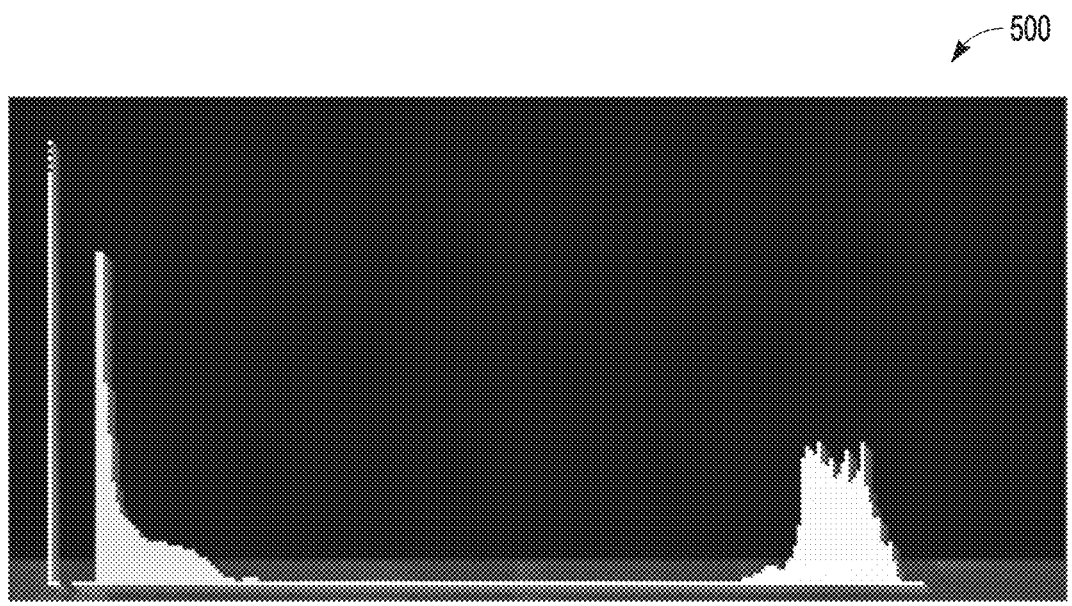
FIG. 10 is an illustration of a histogram of a movie frame illustrating wide brightness ranges according to an example embodiment.

However, it's rare that the full brightness range of an HDR image is actually used by any movie frame. If you look at the histogram of a movie frame as shown in FIG. 10, there are big gaps, which means there are wide brightness ranges which aren't used in the image at all.

This led the inventor to question: "Why not compress the HDR image more intelligently, by using a lower compression factor for brightness levels which are commonly used in the image, and using a much higher compression factor for brightness levels which are not used at all (or only rarely used)?"

In some way this idea is related to histogram equalization. However, histogram equalization often totally changes the look of an image, increasing contrast very strongly. That can actually look pleasing, from a subjective point of view, but when talking about movie playback, the movie is usually encoded based on artistic decisions made by the movie creators, referred to as the director's intent. One consideration is to not change the director's intent or to minimize such changes to the director's intent. This means that histogram equalization cannot be used as it is.

In one embodiment, a contrast recovery algorithm, or in a more technical form Histogram Shaped Tone Mapping (HSTM) algorithm is used. The algorithm uses an intelligently shaped tone mapping curve, to optimize the detail and contrast of the resulting tone mapped images. Such tone mapped images may be consistent, or at least not substantially deviate from a video director's intent. In other words, the resulting video being displayed has similar detail and contrast to what the creator of the video intended for display.

In one embodiment, HSTM utilizes the following work flow:

1) In a first step, HSTM measures the properties of the current video frame (peak, average picture level (APL) and histogram).
2) HSTM creates a conventional tone mapping compression curve, taking peak and APL into account, but ignoring the shape of the histogram.
3) HSTM creates an LUT (lookup table) for each possible brightness level encoded in the video stream. The LUT is filled with the tone mapping curve created in step 2). Afterwards LUT[0] (the first element in the look up table) contains the tone mapped brightness value for a black pixel and LUT[max] contains the tone mapped brightness value for the brightest pixel in the video frame.
4) The LUT tone mapping curve is converted to a "difference" curve by subtracting the previous LUT element. So LUT[0] stays the same. LUT[1] calculates as "LUT[1]=LUT[1]−LUT[0]", or more generally: "LUT[n]=LUT[n]−LUT[n−1]". This way each LUT entry contains the brightness difference (addition) compared to the previous (darker) LUT entry.
5) In order to maintain director's intent, no entry in the "difference" LUT should exceed a threshold value of 1.0, because a value of 1.0 is exactly the brightness difference obtained when rendering the movie without any tone mapping on a true 10,000 nits display. Note that in some embodiments, the threshold value may be set greater than 1.0 if desired, resulting in deviation from the director's intent. The director's intent is assumed to be what would appear when playing the video on a display that has a peak luminance ability matching that of a director created master version of the video. The director's actual intent sometimes is a grey area, especially when it comes to HDR, and without specifically asking a director to describe what the exact lighting/coloring of all parts of a scene are supposed to look like, which typically doesn't or can't happen; so a director's actual intent is somewhat subject to interpretation. The user's interpretation may be used to set the threshold value to something other than 1.0. Different values may be tried by the user and selected based on the user's preference derived from watching the resulting videos on a selected display device.
6) Next, the LUT is adjusted, based on the histogram. The histogram contains exactly one column for each LUT element. The LUT is iterated through and each LUT entry is compressed of expanded, depending on the height of each histogram column. The exact compression or expansion factor is derived from a pre-defined curve (optionally user adjustable). The higher a histogram column is, the more the difference value of the matching LUT entry is expanded. Through this process the LUT is re-shaped to adjust to the shape of the histogram.

7) Next, the LUT is normalized so that the output matches an intended brightness target. The target is peak luminance of the user's display, which the user may provide.

8) Next, the normalized LUT is looped through to make sure that no LUT value exceeds the threshold value of 1.0, because doing so would violate director's intent (the difference between two encoded brightness steps would be expanded beyond what a true 10,000 nits display would show). If any LUT entries exceed the threshold value of 1.0, they're clipped to 1.0. If any LUT values had to be clipped to 1.0, step 7) is returned to, because clipping LUT values to 1.0 means that the LUT is no longer normalized. Steps 7 and 8 may be repeated. However, in further embodiments, the threshold value of 1.0 may be modified to deviate from the director's intent as desired. While not complying perfectly with the director's intent, using a higher threshold value may be more efficient.

9) Finally, the LUT is converted back from the "difference" format to the normal format. The "normal format" simply performs the tone mapping compression. So each LUT entry contains the final luminance for pixels that have the brightness which matches the LUT entry. To converted back, the LUT values are added back up like "LUT[n]=LUT[n]+LUT[n−1]". This LUT now contains the Histogram Shaped Tone Mapping curve, which optimizes detail and contrast, but without deviating from director's intent unless a threshold value higher than 1.0 is used. Such higher or lower threshold values may be selected by a user to modify the appearance of the video to deviate from the director's intent as desired by the user.

Improvement 6) HDR Neural Network Tone Mapping: Tone Mapping needs to make decisions about how much saturation vs luminance to sacrifice for each pixel. This decision making is usually hard coded. In a new approach, a neural network is trained to make intelligent decisions, based on various factors, including the neighbor pixels, to maximize overall image quality.

Improvement 7) Upscaling Chroma by using Luma channel information: Usually Chroma information is upscaled using a simple linear interpolation method. In a new approach, a neural network is trained and used to upscale Chroma by making use of the higher resolution Luma channel.

Improvement 8) Motion Interpolation using Neural Networks: A new Motion Interpolation technique uses one or more trained Neural Networks to produce superior results.

Improvement 9) Motion Compensated Noise Reduction using Neural Networks: Random noise and film grain are filtered out using motion compensated noise reduction via trained neural networks.

Improvement 10) Grain/noise agnostic upscaling using Neural Networks: Video is upscaled by performing the following operations:
 a) Motion Compensated Noise Reduction using neural networks.
 b) Upscaling the video using neural networks.
 c) Put high quality grain back in, in the same strength as which a) removed.

Improvement 11) Frame catchup. One challenge with video processing exists where two "system clocks" do not run at the exact same frequency. For instance, a video source may use 23.979 Hz while a display (or output) may operate at 23.975 Hz. This small discrepancy requires that a video frame be "repeated" (aka duplicates) once every x minutes, depending on the output rate. This is typically once every 4-5 minutes for 24 Hz material and once every 8-12 minutes for 60 Hz. To the astute video enthusiast, this repeated/duplicated signal frame every x minutes stands out like a sore thumb and is a great annoyance, because it appears as if the video freezes (glitches) for a split second when the repeat happens. The repeated frame cannot be eliminated due to the clock mismatch.

In one embodiment, the repeat is made to occur at moments when it cannot be seen. Examples include a fade to black scene or a scene with little or no motion. Once that frame is purposely duplicated, the x minute clock starts over before the next repeated frame would occur. By proactively looking for places to hide the repeated frame, the frame may be repeated in manner to occur in unnoticeable situations.

Further details:

An enhanced frame catchup method avoids visible motion artifacts when input/output frame rate doesn't match perfectly:

1) All devices usually have a hardware clock circuit which can be programmed to provide signals/impulses in a defined interval. For example, an UHD HDR Blu-Ray Player will setup a clock circuit to send out 24.000/1.001=23.976 video frames per second, so the clock circuit will provide a signal each 1000/24.000*1.001=41.708333 milliseconds. An Audio/Video Receiver (AVR) or a video processor will have another clock circuit to do the same.

2) Unfortunately, clock circuits in different devices (or even 2 clock circuits in the same device) never automatically match with 1000% accuracy. Which means one clock will usually run ever so slightly faster or slower than the other clock. For example, in an AVR or video processor device, the incoming video signal might have a frame rate of 23.9765 fps (frames per second), while the outgoing signal might have a frame rate of 23.9755 fps. In this situation the outgoing signal is slower than the incoming signal, which means after a while the incoming frames will pile up because they can't be sent out quickly enough. No device can store frames endlessly, so at some point some of the piled-up frames will have to be dropped, which usually results in a visible stutter on screen. Sometimes the outgoing signal can also be faster than the incoming signal. In that case not enough frames are coming in to satisfy the outgoing signal. Which means some of the incoming frames need to be repeated (sent out twice). This also usually results in a visible stutter on screen.

3) There are multiple solutions to avoid the visible stutter, for example:
 a. A device could try to lock its internal clock to the exact speed of the incoming signal. This is usually called "genlock".
 b. A device could use motion interpolation or frame blending to account for the frame rate difference.

4) The enhanced catchup frame method utilizes a different approach. It works like this:

Dropping or repeating a frame usually results in a visible stutter. While the enhanced catch frame method does that, it actively searches for frames that can be dropped or repeated to minimize the cumulative difference in frames due to the different frame rates in such a way that no visible artifact becomes noticeable by a viewer. This is done as follows:

If a frame needs to be dropped:
  a. Incoming frames are analyzed to find completely black frames. This is not a rare thing to happen in a movie, e.g. when there's a fade-to-black at the end of a scene. If there are multiple black frames in a row, one (or even multiple) can be dropped without producing any visible problems.
  b. Incoming frames are also analyzed to find completely identical frames. This can happen e.g. in static scenery footage. In such a case one of the frames can be dropped without producing any visible problems. Due to lossy compression, frames might not be mathematically identical, but can still be visually identical, so a frame is to be considered "identical", if the per-pixel difference in below a reasonable threshold.
  c. Incoming frames are analyzed to find scene cuts (an algorithm to detect such scene cuts will be described in detail separately). If one scene ends and a new scene starts, there's a very visible discontinuity in the video stream, which viewers don't see as a motion artifact. In such a situation we can drop the last frame(s) of the ending scene and/or the first frame(s) of the new scene without introducing any visible problems.

If a frame needs to be repeated:
  a. Incoming frames are analyzed to find completely black frames. If there are multiple black frames in a row, one (or even multiple) additional black frames can be added without producing any visible problems.
  b. Incoming frames are analyzed to find for completely identical frames. In such a case one of the frames can be repeated without any visible problems.
  c. Incoming frames are analyzed to find scene cuts. In such a situation a blended frame which consists of 50% of the last frame of the ending scene and 50% of the first frame of the new scene can be inserted. The blend formula in one embodiment is simply: "InsertedFrame=(LastFrameOfEndingScene+FirstFrameOfNewScene)/2", where the blending is done pixel by pixel. For best image quality, blending can optionally be performed in linear light.

There may be longer passages in a movie where none of the above described situations occur, so no frame can be dropped or repeated safely. Because this can happen, more frames than actually needed may be dropped or repeated in advance, to provide headroom. If the incoming signal is too fast, a couple of frames may be buffered, if need be, to wait for a situation where the needed number of frames can by unobtrusively dropped. However, buffering too many frames may result in audio/video sync, resulting in a noticeable mismatch between the audio and video signal.

Some of the above improvements involve the use of AI to perform various functions. For example, improvement 6, HDR Neural Network Tone Mapping involves a trained neural network model to make decisions about saturation versus luminance for each pixel in video frames. The model may be obtained by using labeled pixel information. The labels may be used to identify each pixel and the image quality associated with that pixel based on neighboring pixels. Improvements 7, 8, 9, and 10 may be similarly trained.

Artificial intelligence (AI) is a field concerned with developing decision-making systems to perform cognitive tasks that have traditionally required a living actor, such as a person. Neural networks (NN), such as convolutional neural networks, are computational structures that are loosely modeled on biological neurons. Generally, NNs encode information (e.g., data or decision making) via weighted connections (e.g., synapses) between nodes (e.g., neurons). Modern NNs are foundational to many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Figure 11:
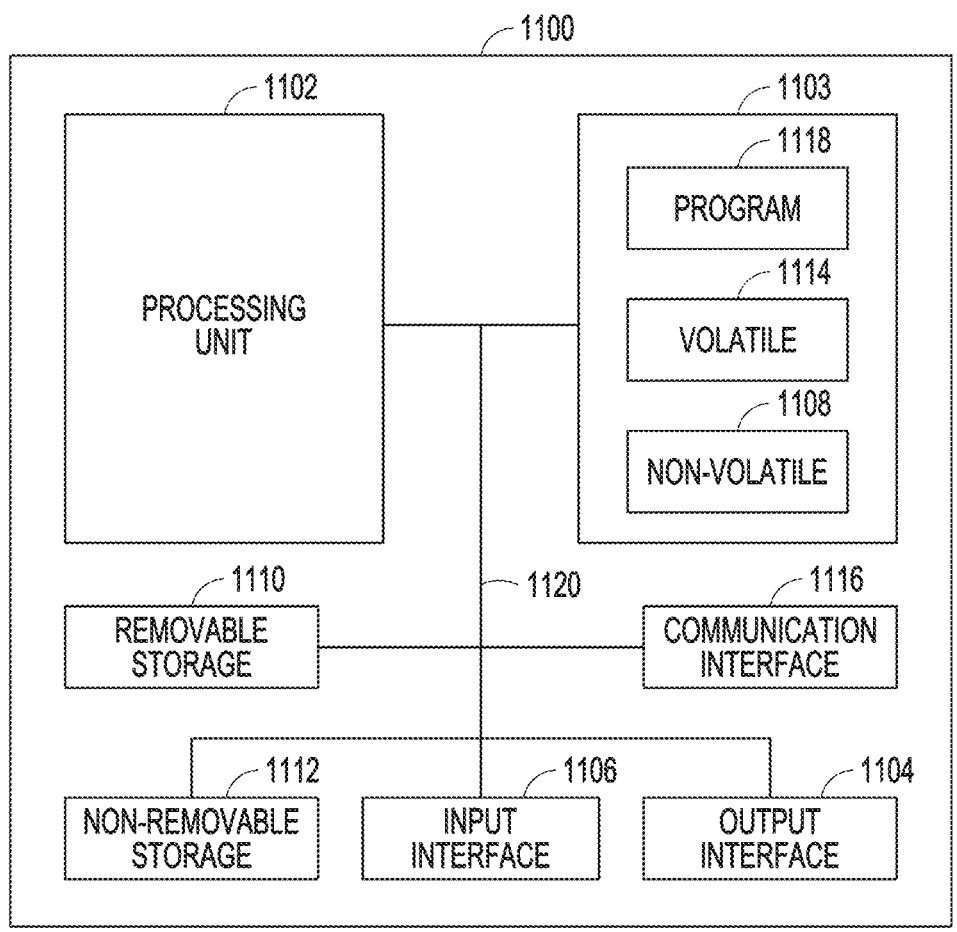
FIG. 11 is a block schematic diagram of a computer system to implement devices to perform improvements, methods, and algorithms according to example embodiments.

FIG. 11 is a block schematic diagram of a computer system 1100 to implement devices to perform improvements, methods, and algorithms according to example embodiments. All components need not be used in various embodiments.

One example computing device in the form of a computer 1100 may include a processing unit 1102, memory 1103, removable storage 1110 such as a UHD HDR Blu-Ray Player, and non-removable storage 1112, each of which may store high resolution video. Although the example computing device is illustrated and described as computer 1100, the computing device may be in different forms in different embodiments. For example, the computing device may instead be a smartphone, a tablet, smartwatch, smart storage device (SSD), or other computing device including the same or similar elements as illustrated and described with regard to FIG. 11. Devices, such as smartphones, tablets, and smartwatches, are generally collectively referred to as mobile devices or user equipment.

Although the various data storage elements are illustrated as part of the computer 1100, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The display device may be a device such as a projector or other display that usually has a capability that is not sufficient to display the full dynamic range of stored video. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software to implement one or more improvements described herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 along with the workspace manager 1122 may be used to cause processing unit 1102 to perform one or more methods or algorithms described herein.

Sets of examples are now provided. It should be noted that the sets of example may be combined in further embodiments, with features and functions of different examples operating together.

Highlight Recovery Examples:

1. A computer implemented method includes receiving a video sequence having image frames with a high dynamic range, separating each image frame into low and high frequency components, compressing the low frequency components, reconstructing the image frames of the video sequence by combining the high frequency components with the compressed low frequency components, and rendering the reconstructed image frames of the video sequence for display on a device having a lower dynamic range.

2. The method of method 1 wherein the received video sequence comprises pixels with a luminance range of 0 to up to 10,000 its.

3. The method of any of examples 1-2 wherein the lower dynamic range comprises 0 to 200 nits.

4. The method of any of examples 1-3 wherein reconstructing the image frames of the video sequence comprises adding the high frequency components to the compressed low frequency components.

5. The method of any of examples 1-4 wherein compressing the low frequency components comprises tone mapping the low frequency components.

6. The method of any of examples 1-5 wherein separating each image into low and high frequency components comprises blurring each video frame image and subtracting the blurred video frame images from the received video frame images to obtain the high frequency components.

7. The method of example 6 wherein the blurring is performed using a Gaussian blur.

8. The method of example 6 wherein the blurring is performed using an edge preserving blur that preserves the geodesic distance between points on the curves, adaptively warping an input signal perform 1D edge-preserving filtering in linear time.

9. A machine-readable storage device has instructions for execution by a processor of a machine to cause the processor to perform operations to perform a method. The operations include receiving a video sequence having image frames with a high dynamic range, separating each image frame into low and high frequency components, compressing the low frequency components, and reconstructing the image frames of the video sequence by combining the high frequency components with the compressed low frequency components, and rendering the reconstructed image frames of the video sequence for display on a device having a lower dynamic range.

10. The device of example 8 wherein the received video sequence comprises pixels with a luminance range of 0 to up to 10,000 its.

11. The device of any of examples 9-10 wherein the lower dynamic range comprises 0 to 200 nits.

12. The device of any of examples 9-11 wherein reconstructing the image frames of the video sequence comprises adding the high frequency components to the compressed low frequency components.

13. The device of any of examples 9-12 wherein compressing the low frequency components comprises tone mapping the low frequency components.

14. The device of any of examples 9-13 wherein separating each image into low and high frequency components comprises blurring each video frame image and subtracting the blurred video frame images from the received video frame images to obtain the high frequency components.

15. The device of example 14 wherein the blurring is performed using a Gaussian blur.

16. The device of example 14 wherein the blurring is performed using an edge preserving blur that preserves the geodesic distance between points on the curves, adaptively warping an input signal perform 1D edge-preserving filtering in linear time.

17. A device includes a processor and a memory device coupled to the processor and having a program stored thereon for execution by the processor to perform operations. The operations include receiving a video sequence having image frames with a high dynamic range, separating each image frame into low and high frequency components, compressing the low frequency components, reconstructing the image frames of the video sequence by combining the high frequency components with the compressed low frequency components, and rendering the reconstructed image frames of the video sequence for display on a device having a lower dynamic range.

18. The device of example 17 wherein the received video sequence comprises pixels with a luminance range of 0 to up to 10,000 nits.

19. The device of any of examples 17-18 wherein the lower dynamic range comprises 0 to 200 nits.

20. The device of any of examples 17-19 wherein reconstructing the image frames of the video sequence comprises adding the high frequency components to the compressed low frequency components.

21. The device of any of examples 17-20 wherein compressing the low frequency components comprises tone mapping the low frequency components.

22. The device of any of examples 16-21 wherein separating each image into low and high frequency components comprises blurring each video frame image and subtracting the blurred video frame images from the received video frame images to obtain the high frequency components.

23. The device of example 22 wherein the blurring is performed using a Gaussian blur.

24. The device of example 22 wherein the blurring is performed using an edge preserving blur that preserves the geodesic distance between points on the curves, adaptively warping an input signal perform 1D edge-preserving filtering in linear time.

25. A computer implemented method includes receiving a video sequence having image frames with a first dynamic range including both low frequency components and high frequency components, separating each image frame into the low frequency components and the high frequency components, compressing the low frequency components, reconstructing the image frames of the video sequence by combining the high frequency components with the compressed low frequency components, and rendering the reconstructed image frames of the video sequence for display on a device having a second dynamic range, the second dynamic range being less than the first dynamic range.

Frame Catchup:

1. A computer implemented method includes receiving image frames of an input video sequence having a first frame rate, processing the image frames of the input video sequence to provide an output video sequence having a second frame rate different that the first frame rate, detecting image frames of the output video sequence to identify candidate frames for dropping or inserting frames without causing a visible discontinuity while viewing a display of the output video sequence, and adding or dropping a frame as a function of the first and second frame rates at a selected candidate frame being displayed.

2. The method of example 1 wherein a need to add or drop a frame occurs every four to five minutes for a 24 Hz video sequence.

3. The method of any of examples 1-2 wherein add or drop a frame occurs every 8-12 minutes for a 60 Hz video sequence.

4. The method of any of examples 1-3 wherein add or drop a frame occurs as a function of the difference between the first frame rate and the second frame rate times time.

5. The method of any of examples 1-4 wherein detecting candidate frames comprises finding completely back frames.

6. The method of any of examples 1-5 wherein detecting candidate frames comprises finding consecutive visually identical frames.

7. The method of any of examples 1-6 wherein detecting candidate frames comprises finding scene cuts exhibiting a visible discontinuity.

8. The method of example 7 wherein a blended frame is inserted between scene cut candidate frames.

9. The method of example 8 wherein the blended frame comprises an average of two consecutive scene cute candidate frames.

10. The method of any of examples 1-9 and further including buffering a couple of frames and delaying adding or dropping a frame until candidate frames have been identified.

11. The method of any of examples 1-10 and further including buffering a couple of frames and adding or dropping a frame before a need to add or drop a frame occurs as a function of the difference in frame rates.

12. A machine-readable storage device has instructions for execution by a processor of a machine to cause the processor to perform operations to perform a method. The operations include receiving image frames of an input video sequence having a first frame rate, processing the image frames of the input video sequence to provide an output video sequence having a second frame rate different that the first frame rate, detecting image frames of the output video sequence to identify candidate frames for dropping or inserting frames without causing a visible discontinuity while viewing a display of the output video sequence, and adding or dropping a frame as a function of the first and second frame rates at a selected candidate frame being displayed.

13. The device of example 12 wherein a need to add or drop a frame occurs every four to five minutes for a 24 Hz video sequence.

14. The device of any of examples 12-13 wherein add or drop a frame occurs every 8-12 minutes for a 60 Hz video sequence.

15. The device of any of examples 12-14 wherein add or drop a frame occurs as a function of the difference between the first frame rate and the second frame rate times time.

16. The device of any of examples 12-15 wherein detecting candidate frames comprises finding completely back frames.

17. The device of any of examples 12-16 wherein detecting candidate frames comprises finding consecutive visually identical frames.

18. The device of any of examples 12-17 wherein detecting candidate frames comprises finding scene cuts exhibiting a visible discontinuity.

19. The device of example 18 wherein a blended frame is inserted between scene cut candidate frames.

20. The device of example 19 wherein the blended frame comprises an average of two consecutive scene cute candidate frames.

21. The device of any of examples 12-20 and further including buffering a couple of frames, and delaying adding or dropping a frame until candidate frames have been identified.

22. The device of any of examples 12-21 and further including buffering a couple of frames and adding or dropping a frame before a need to add or drop a frame occurs as a function of the difference in frame rates.

23. A device includes a processor and a memory device coupled to the processor and having a program stored thereon for execution by the processor to perform operations. The operations include receiving image frames of an input video sequence having a first frame rate, processing the image frames of the input video sequence to provide an output video sequence having a second frame rate different that the first frame rate, detecting image frames of the output video sequence to identify candidate frames for dropping or inserting frames without causing a visible discontinuity while viewing a display of the output video sequence, and adding or dropping a frame as a function of the first and second frame rates at a selected candidate frame being displayed.

24. The device of example 23 wherein a need to add or drop a frame occurs every four to five minutes for a 24 Hz video sequence.

25. The device of any of examples 23-24 wherein add or drop a frame occurs every 8-12 minutes for a 60 Hz video sequence.

26. The device of any of examples 23-25 wherein add or drop a frame occurs as a function of the difference between the first frame rate and the second frame rate times time.

27. The device of any of examples 23-26 wherein detecting candidate frames comprises finding completely back frames.

28. The device of any of examples 23-27 wherein detecting candidate frames comprises finding consecutive visually identical frames.

29. The device of any of examples 23-28 wherein detecting candidate frames comprises finding scene cuts exhibiting a visible discontinuity.

30. The device of example 29 wherein a blended frame is inserted between scene cut candidate frames.

31. The device of example 30 wherein the blended frame comprises an average of two consecutive scene cut candidate frames.

32. The device of any of examples 23-31 and further including buffering a couple of frames and delaying adding or dropping a frame until candidate frames have been identified.

33. The device of any of examples 23-32 and further including buffering a couple of frames and adding or dropping a frame before a need to add or drop a frame occurs as a function of the difference in frame rates.

Contrast Recovery Examples:

1. A computer implemented method includes receiving image frames of an input video stream, creating a tone mapping compression curve for each image frame as a function of peak and average picture level, creating a normal format lookup table for each brightness level, the lookup table having elements filled with the created tone mapping compression curve, converting the look up table tone mapping curve to a difference curve, adjusting the lookup table values based on a histogram containing one column for each lookup table element, normalizing the lookup table values to match an intended brightness target, and converting the normalized lookup table values back to the normal format.

2. The method of example 1 wherein creating a tone mapping compression curve is performed independent of the histogram.

3. The method of any of examples 1-2 wherein a first element in the lookup table contains a tone mapped brightness value of a black pixel and a last element in the lookup table contains a tone mapped brightness value for the brightest pixel in the image frame.

4. The method of any of examples 1-3 wherein converting the lookup table mapping curve to a difference curve comprises for each successive element, subtracting the previous element value such that each lookup table value corresponds to a brightness difference compared to previous element.

5. The method of example 4 wherein adjusting the lookup table values comprises compressing or expanding each value depending on a height of each corresponding histogram column to re-shape the lookup table values to adjust to the shape of the histogram.

6. The method of example 5 and further including clipping values exceeding a threshold value and repeating normalizing and clipping until no values exceed the threshold value.

7. The method of example 6 wherein the threshold value comprises 1.0.

8. The method of example 6 wherein the threshold value is greater than 1.0.

9. The method of example any of examples 1-8 wherein converting the lookup table values back to the normal format comprises adding the sequential values in accordance with LUT[n]=LUT[n]+LUT[n−1], wherein LUT is the lookup table and n is a sequential value in the lookup table.

10. A machine-readable storage device has instructions for execution by a processor of a machine to cause the processor to perform operations to perform a method. The operations include receiving image frames of an input video stream, creating a tone mapping compression curve for each image frame as a function of peak and average picture level, creating a normal format lookup table for each brightness level, the lookup table having elements filled with the created tone mapping compression curve, converting the look up table tone mapping curve to a difference curve, adjusting the lookup table values based on a histogram containing one column for each lookup table element, normalizing the lookup table values to match an intended brightness target, and converting the normalized lookup table values back to the normal format.

11. The device of example 10 wherein creating a tone mapping compression curve is performed independent of the histogram.

12. The device of any of examples 10-11 wherein a first element in the lookup table contains a tone mapped brightness value of a black pixel and a last element in the lookup table contains a tone mapped brightness value for the brightest pixel in the image frame.

13. The device of any of examples 11-12 wherein converting the lookup table mapping curve to a difference curve comprises for each successive element, subtracting the previous element value such that each lookup table value corresponds to a brightness difference compared to previous element.

14. The device of example 13 wherein adjusting the lookup table values comprises compressing or expanding each value depending on a height of each corresponding histogram column to re-shape the lookup table values to adjust to the shape of the histogram.

15. The device of example 14 and further including clipping values exceeding a threshold value and repeating normalizing and clipping until no values exceed the threshold value.

16. The device of example 15 wherein the threshold value comprises 1.0.

17. The device of example 15 wherein the threshold value is greater than 1.0.

18. The device of example any of examples 11-17 wherein converting the lookup table values back to the normal format comprises adding the sequential values in accordance with LUT[n]=LUT[n]+LUT[n−1], wherein LUT is the lookup table and n is a sequential value in the lookup table.

19. A device includes a processor and a memory device coupled to the processor and having a program stored thereon for execution by the processor to perform operations. The operations include receiving image frames of an input video stream, creating a tone mapping compression curve for each image frame as a function of peak and average picture level, creating a normal format lookup table for each brightness level, the lookup table having elements filled with the created tone mapping compression curve, converting the look up table tone mapping curve to a difference curve, adjusting the lookup table values based on a histogram containing one column for each lookup table element, normalizing the lookup table values to match an intended brightness target, and converting the normalized lookup table values back to the normal format.

20. The device of example 19 wherein creating a tone mapping compression curve is performed independent of the histogram.

21. The device of any of examples 19-20 wherein a first element in the lookup table contains a tone mapped brightness value of a black pixel and a last element in the lookup table contains a tone mapped brightness value for the brightest pixel in the image frame.

22. The device of any of examples 19-21 wherein converting the lookup table mapping curve to a difference curve comprises for each successive element, subtracting the previous element value such that each lookup table value corresponds to a brightness difference compared to previous element.

23. The device of example 22 wherein adjusting the lookup table values comprises compressing or expanding each value depending on a height of each corresponding histogram column to re-shape the lookup table values to adjust to the shape of the histogram.

24. The device of example 23 and further including clipping values exceeding a threshold value and repeating normalizing and clipping until no values exceed the threshold value.

25. The device of example 24 wherein the threshold value comprises 1.0.

26. The device of example 24 wherein the threshold value is greater than 1.0.

27. The device of example any of examples 19-26 wherein converting the lookup table values back to the normal format comprises adding the sequential values in accordance with LUT[n]=LUT[n]+LUT[n−1], wherein LUT is the lookup table and n is a sequential value in the lookup table.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The following statements are potential claims that may be converted to claims in a future application. No modification of the following statements should be allowed to affect the interpretation of claims which may be drafted when this provisional application is converted into a regular utility application.

The invention claimed is:

1. A computer implemented method comprising:
   receiving a video sequence having image frames containing pixels with a high dynamic range;
   separating each image frame into low and high frequency components;
   compressing the low frequency components using a non-linear brightness compression curve including tone mapping the low frequency components;
   reducing brightness and saturation for pixels of the low frequency components which are outside a target gamut;
   reconstructing the image frames of the video sequence by combining the high frequency components with the compressed and reduced brightness and saturation for pixels of the low frequency components; and
   rendering the reconstructed image frames of the video sequence during real time playback for display on a device having a lower dynamic range, while preserving highlight detail, wherein tone mapping the low frequency components comprises:
   determining a tone mapping for each successive image frame;
   smoothing the tone mapping to reduce visible flickering artifacts;
   detecting a scene change; and
   discontinuing smoothing the tone mapping for a first image frame of the detected scene change.

2. The method of claim 1 wherein the image frame pixels have a luminance range of 0 to up to 10,000 nits, and further comprising:
   repairing damage to a luminance channel of each image frame caused by reducing brightness and saturation for pixels of the components; and
   reducing saturation following repairing damage such that the pixels fit withing the target gamut.

3. The method of claim 1 wherein the lower dynamic range comprises 0 to 200 nits.

4. The method of claim 1 wherein reconstructing the image frames of the video sequence comprises adding the high frequency components to the compressed low frequency components.

5. The method of claim 1 wherein separating each image into low and high frequency components comprises blurring each video frame image and subtracting the blurred video frame images from the received video frame images to obtain the high frequency components.

6. The method of claim 5 wherein the blurring is performed using a Gaussian blur.

7. The method of claim 5 wherein the blurring is performed using an edge preserving blur that preserves a geodesic distance between points on curves, adaptively warping an input signal to perform 1D edge-preserving filtering in linear time.

8. A machine-readable storage device having instructions for execution by a processor of a machine to cause the processor to perform operations to perform a method, the operations comprising:
   receiving a video sequence having image frames with a high dynamic range;
   separating each image frame into low and high frequency components;
   compressing the low frequency components using a non-linear brightness compression curve including tone mapping the low frequency components;
   reducing brightness and saturation for pixels of the low frequency components which are outside a target gamut;
   reconstructing the image frames of the video sequence by combining the high frequency components with the compressed and reduced brightness and saturation for pixels of the low frequency components; and
   rendering the reconstructed image frames of the video sequence during real time playback for display on a device having a lower dynamic range, while preserving highlight detail, wherein tone mapping the low frequency components comprises:
   determining a tone mapping for each successive image frame;
   smoothing the tone mapping to reduce visible flickering artifacts;
   detecting a scene change; and
   discontinuing smoothing the tone mapping for a first image frame of the detected scene change.

9. The device of claim 8 wherein the image frame pixels have a luminance range of 0 to up to 10,000 nits.

10. The device of claim 8 wherein the lower dynamic range comprises 0 to 200 nits.

11. The device of claim 8 wherein reconstructing the image frames of the video sequence comprises adding the high frequency components to the compressed low frequency components.

12. The device of claim 8 wherein separating each image into low and high frequency components comprises blurring each video frame image and subtracting the blurred video frame images from the received video frame images to obtain the high frequency components.

13. The device of claim 12 wherein the blurring is performed using a Gaussian blur.

14. The device of claim 12 wherein the blurring is performed using an edge preserving blur that preserves a geodesic distance between points on curves, adaptively warping an input signal to perform 1D edge-preserving filtering in linear time.

15. A device comprising:
a processor; and
a memory device coupled to the processor and having a program stored thereon for execution by the processor to perform operations comprising:
receiving a video sequence having image frames with a high dynamic range;
separating each image frame into low and high frequency components;
compressing the low frequency components using a non-linear brightness compression curve including tone mapping the low frequency components;
reducing brightness and saturation for pixels of the low frequency components which are outside a target gamut;
reconstructing the image frames of the video sequence by combining the high frequency components with the compressed and reduced brightness and saturation for pixels of the low frequency components; and
rendering the reconstructed image frames of the video sequence during real time playback for display on a device having a lower dynamic range, while preserving highlight detail, wherein tone mapping the low frequency components comprises:
determining a tone mapping for each successive image frame;
smoothing the tone mapping to reduce visible flickering artifacts;
detecting a scene change; and
discontinuing smoothing the tone mapping for a first image frame of the detected scene change.

16. The device of claim 15 wherein the image frame pixels have a luminance range of 0 to up to 10,000 its.

17. The device of claim 15 wherein reconstructing the image frames of the video sequence comprises adding the high frequency components to the compressed low frequency components and wherein separating each image into low and high frequency components comprises blurring each video frame image and subtracting the blurred video frame images from the received video frame images to obtain the high frequency components.

18. The device of claim 17 wherein the blurring is performed using an edge preserving blur that preserves a geodesic distance between points on curves, adaptively warping an input signal to perform 1D edge-preserving filtering in linear time.

\* \* \* \* \*